United States Patent [19]

Eom et al.

[11] Patent Number: 5,754,793
[45] Date of Patent: May 19, 1998

[54] WAVELET IMAGE COMPRESSION/ RECOVERY APPARATUS AND METHOD USING HUMAN VISUAL SYSTEM MODELING

[75] Inventors: Il-Kyu Eom; Jae-Ho Kim, both of Busan; Dong-Seek Park, Daegu, all of Rep. of Korea

[73] Assignee: SamSung Electronics Co., Ltd., Suwon, Rep. of Korea

[21] Appl. No.: 510,621

[22] Filed: Aug. 3, 1995

[30] Foreign Application Priority Data

Apr. 19, 1995 [KR] Rep. of Korea .................. 9253/1995

[51] Int. Cl.$^6$ ................................................ H04N 1/413
[52] U.S. Cl. .................................. 395/200.77; 358/463
[58] Field of Search ........................ 364/514 R, 514 A, 364/715.02; 348/405; 371/235, 248, 251, 268; 395/114, 200.77; 358/463, 467

[56] References Cited

U.S. PATENT DOCUMENTS

| | | |
|---|---|---|
| 5,136,377 | 8/1992 | Johnston et al. . |
| 5,347,479 | 9/1994 | Miyazaki . |
| 5,420,636 | 5/1995 | Kojima .................................. 348/403 |
| 5,517,581 | 5/1996 | Johnston et al. ...................... 382/232 |
| 5,526,052 | 6/1996 | Ar ........................................... 348/405 |
| 5,541,659 | 7/1996 | Kojima .................................. 348/398 |
| 5,557,276 | 9/1996 | Sakazawa et al. .................... 341/200 |

OTHER PUBLICATIONS

.Image Compression Using the 2-D Wavelet Transform., *IEEE Transactions on Image Processing*, vol. 1, No. 2, Apr. 1992, pp. 244-250.

*Primary Examiner*—James P. Trammell
*Assistant Examiner*—Thomas Peeso
*Attorney, Agent, or Firm*—Robert E. Bushnell, Esq.

[57] ABSTRACT

Input image data is wavelet-transformed into wavelet transformed data. First, second and third quantization values respectively corresponding to the frequency variation, background brightness and edge state of the wavelet transformed data are determined. The wavelet transformed data is quantized by using a human visual quantization value for each region corresponding to the first, second and third quantization values. The quantized data is entropy-encoded to generate compressed image data.

35 Claims, 4 Drawing Sheets

WAVELET IMAGE COMPRESSION/ RECOVERY APPARATUS AND METHOD USING HUMAN VISUAL SYSTEM MODELING

CROSS-REFERENCE TO RELATED APPLICATIONS

This application makes reference to, incorporates the same herein, and claims all benefits accruing under 35 U.S.C. §119 from our application for *Wavelet Image Compression/Recovery Apparatus And Method Using Human Visual System Modeling* earlier filed in the Korean Industrial Property Office on 19 Apr. 1995 and there assigned Ser. No. 9253/1995.

BACKGROUND OF THE INVENTION

The present invention relates to a digital image compression and recovery apparatus and method, and more particularly to an apparatus and method for compressing and recovering an image using wavelet transforms and human visual system modeling.

Generally, an image is compressed during transmission to reduce the bit rate of an input image or to increase the efficiency of a storage device for storing image data. In most cases, however, picture quality deteriorates since the integrity of the image data is degraded by the image compression. The ultimate object of image compression is to maintain picture quality by eliminating any appreciable viewing difference between original and compressed images, while maintaining a high compression rate. Block DCT (discrete cosine transform) based coding is currently one of the most general image compression methods in use. Discrete cosine coding based image compression however, has two serious disadvantages, namely, a blocking effect and a mosquito noise (also referred to as corona effect). The blocking effect is attributable principally to quantization error in the generation of lower frequency coefficients while mosquito noise is attributable to quantization errors in the generation of higher frequency coefficients. To overcome these disadvantages, wavelet transform coding has been proposed. An example of this type of coding is described in IEEE Transactions on Image Processing, vol. 1, April, 1992, pp. 244–250, in an article entitled *Image Compression Using the 2-D Wavelet Transform* by A. S. Lewis and G. Knowles.

Another effort using wavelet transformation is disclosed in U.S. Pat. No. 5,347,479 entitled *Small-Sized Wavelet Transform Apparatus* and issued to Miyazaki on 13 Sep. 1994. In Miyazaki '479, a plurality of series of delay units and at least one convolution calculating circuit are used to form a two-band analysis filter circuit. While this type of conventional art has merit in its own right, we believe that image quality can be further improved by modeling a system on a basis of the characteristics of the human eye.

One attempt at incorporating the known protocols characterizing human visual perception into an image processing device is mentioned in U.S. Pat. No. 5,136,377 entitled *Adaptive Non-Linear Quantizer* and issued to Johnston et al. on 4 Aug. 1992. Here, perceptual thresholds are provided for performing bit allocation based on properties of human vision. While this approach clearly has advantages over the conventional methods which attempt only to minimize the mean square error between an original image and an encoded image, we believe that an improved system based upon principles of human visual perception can be constructed.

SUMMARY OF THE INVENTION

Accordingly, it is an object of the present invention to provide an improved wavelet image compression and recovery apparatus and method.

It is another object to provide a wavelet image recovery apparatus and method for recovering wavelet compression data using a model based on the human visual system.

It is still another object to provide a wavelet image compression apparatus and method for obtaining an image exhibiting superior picture quality by using measurements of distortion of human visual characteristics.

It is still yet another object to provide a wavelet image compression and recovery apparatus and method employing frequency variation sensitivity, background brightness sensitivity and edge sensitivity spatial masking effects in the quantization of wavelet data.

These and other objects can be achieved according to the principles of the present invention with a wavelet image compression and recovery apparatus in which an image is wavelet-transformed, noise sensitivity based on the human visual system is determined, and the wavelet transformed data is then quantized in order to provide image compression. A wavelet transformation splits an input image into partial images corresponding to different frequency bands with different resolutions. The wavelet transformation features partial images at different resolutions having a nearly similar form in frequency band separation. Frequency variation noise sensitivity, background brightness noise sensitivity and edge noise sensitivity based on the human visual system are used for quantization of the wavelet coefficients. Prior to compressing the wavelet transformed data, a determination should be made about which portions of the data are sensitive to noise when the image is displayed for viewing. It is known that high frequency portions are not sensed well by the human eye even when no error exist, and that the degree of error occurring during sensing varies with background brightness. Since an edge portion is considered to represent important information when viewing the image, this factor should also be considered. In the preferred embodiment of the present invention, these three factors of frequency variation noise sensitivity, background noise sensitivity and edge noise sensitivity are modeled to enable accurate image compression.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENT

Figure 1:
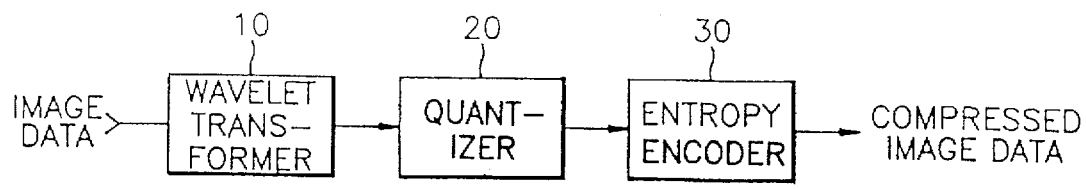
FIG. 1 is a block diagram of a representative of a typical digital image compression circuit using general wavelet transforms.

FIG. 1 is a block diagram of a digital image compression apparatus using general wavelet transforms. Image data is received and wavelet-transformed by a wavelet transformer 10. A quantizer 20 performs a quantization step based on the domain of the wavelet-transformed data to generate quantized data. An entropy encoder 30 entropy-encodes the quantized data to generate compressed image data.

Figure 2:
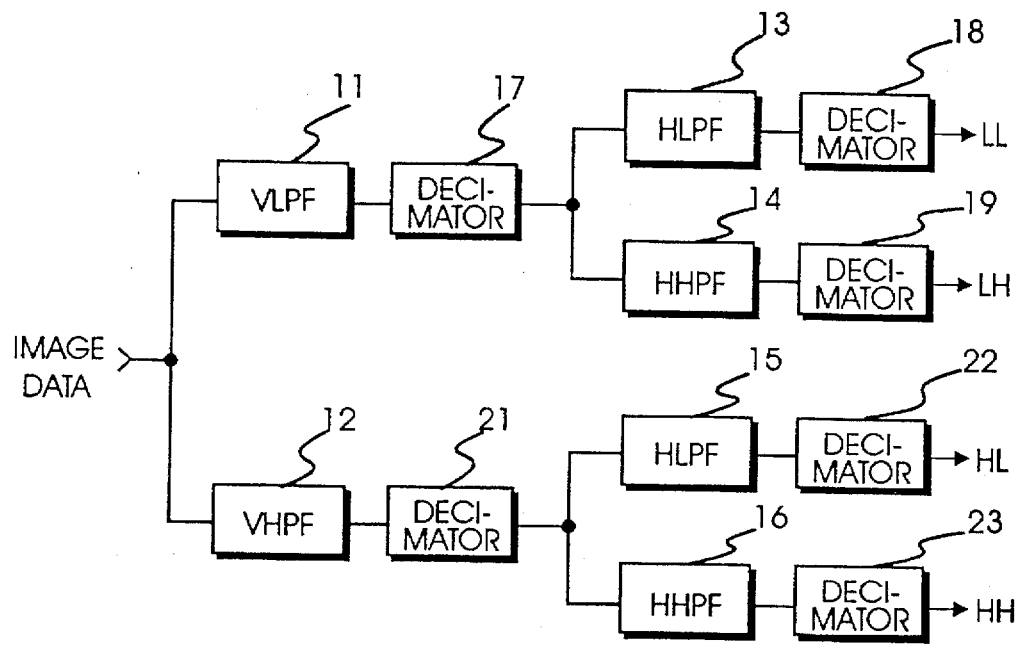
FIG. 2 is a more detailed block diagram of the wavelet transformer shown in FIG. 1.

FIG. 2 is a detailed block diagram of wavelet transformer 10 showing the general structure of a two-dimensional wavelet transformer. To split two-dimensional input image data by wavelet transform, a filter having a pyramid structure is constructed as shown in FIG. 2. During the wavelet transform, the input image passes through a vertical low-pass filter (VLPF) 11 and a vertical high-pass filter (VHPF) 12. The filtered output of VLPF 11 first passes through a decimator 17 which performs a down-sampling operation by a factor of two, and then through a horizontal low-pass filter (BLPF) 13 and a horizontal high-pass filter (HHPF) 14. The output signals from horizontal low-pass filter (HLPF) 13 and horizontal high-pass filter (HHPF) 14 are then separately passed through decimators 18 and 19, respectively, to obtain first and second wavelet transformed images LL and LH, respectively. The filtered output signals from VHPF 12 first passes through a decimator 21 and then through a horizontal low-pass filter (HLPF) 15 and a horizontal high-pass filter (HHPF) 16. The output signals from horizontal low-pass filter (HLPF) 15 and horizontal high-pass filter (HHPF) 16 are then passed through decimators 22 and 23, respectively, to obtain third and fourth wavelet transformed images HL and HH respectively. In order to recover the wavelet transformed images, the filter structure of a reverse wavelet transformer (which is similar to the wavelet transformer) is used to perform a reverse operation of the above-described wavelet transform process. A typical wavelet transformer is disclosed in greater detail, for example, in the aforementioned U.S. Pat. No. 5,347,479.

Figure 3:
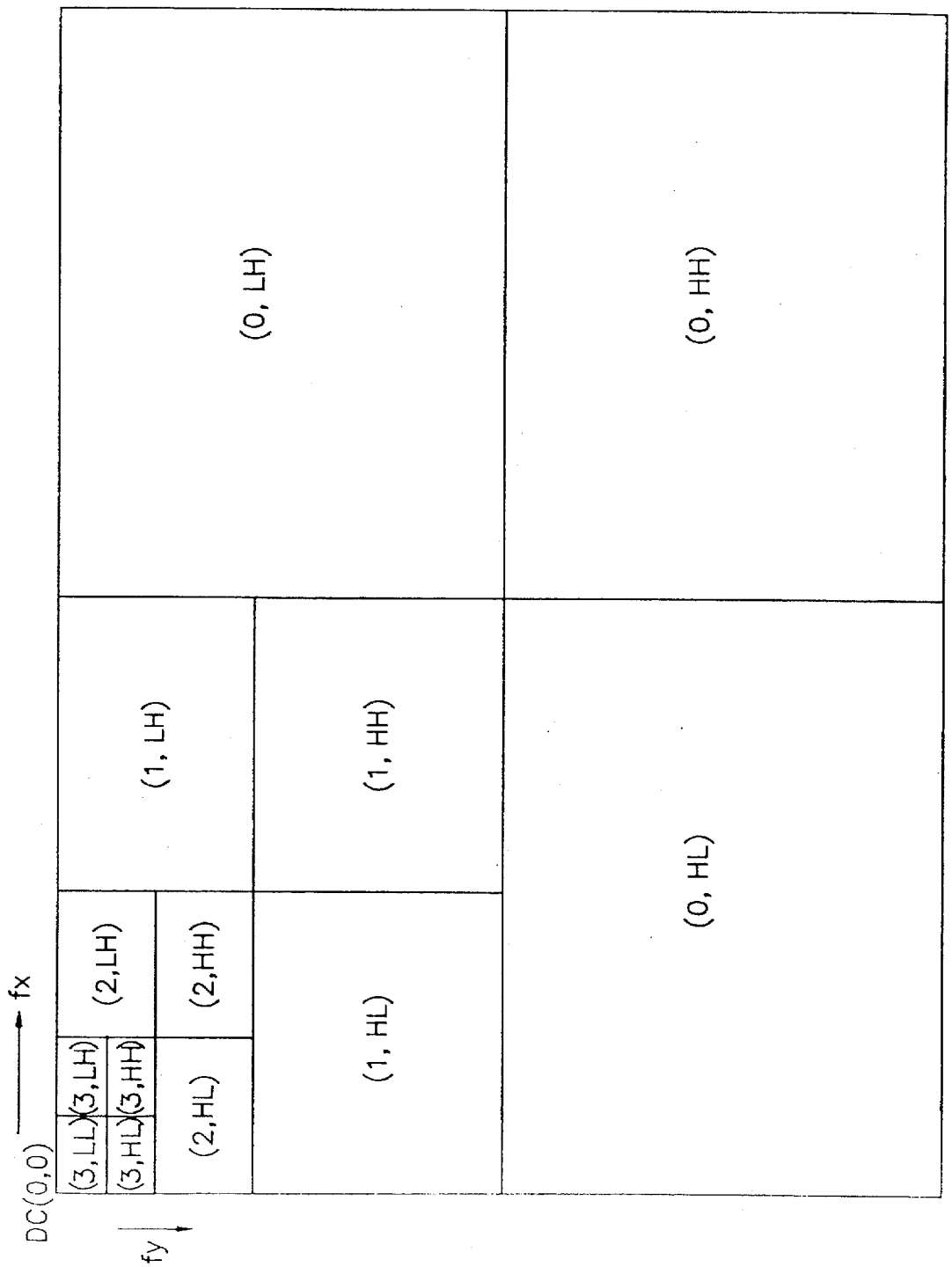
FIG. 3 is a diagram showing an image state split by wavelet transforms.

The position of wavelet transformed data is represented by a region "r" which is one of is regions LL, LH, HL and HH. A step "s" represents how many times the image has been split. If the image is wavelet-transformed four times, s is one of 0, 1, 2 and 3. FIG. 3 shows an illustrative image state split by wavelet transform. Referring now to FIG. 3, the number of times that the image has been split and the filter through which the image has passed can be represented by (s, r). In such cases, the wavelet transformed data is indicated by $I^{s,r}(x, y)$ (where x and y are coordinates of a factor within the partial image).

The image compression apparatus using such conventional wavelet transformation relies upon a mean square error (MSE) and determination of the quality of the compressed image. That is, quantizer 20 sets an error based on the mean square error. Since the true standard of image quality discrimination is the human eye however, conventional image compression method and apparatus principally using mean square error for measuring Euclidean differences in an image, produce inferior picture quality with a low compression rate.

Generally, the human eye determines picture quality by a peculiar method, and is less sensitive to errors in high frequency components. Also, if a background is very bright, the human eye becomes insensitive to errors. Recently, a study on error measurement and image compression using a human visual system has been pursued; the study is in active progress. The human visual system is a field for analyzing and modeling an information processing method based on how a human being visually senses an image. Noise sensitivity factors recognized by the human visual system include: background brightness sensitivity, edge sensitivity (spatial masking), band sensitivity, texture masking, as well as other factors. The noise sensitivity factors contemplated in the practice of the preferred embodiment of the present invention include frequency variation sensitivity, background brightness sensitivity and edge sensitivity.

In the following description, numerous specific details, such as a wavelet transform step value s, are set forth to provide a more through understanding of the present invention. It will be apparent, however, to those skilled in the art that the present invention may be practiced without these specific details. In other instances, well known circuits have not been described so as not to obscure the principles of the present invention.

Figure 4:
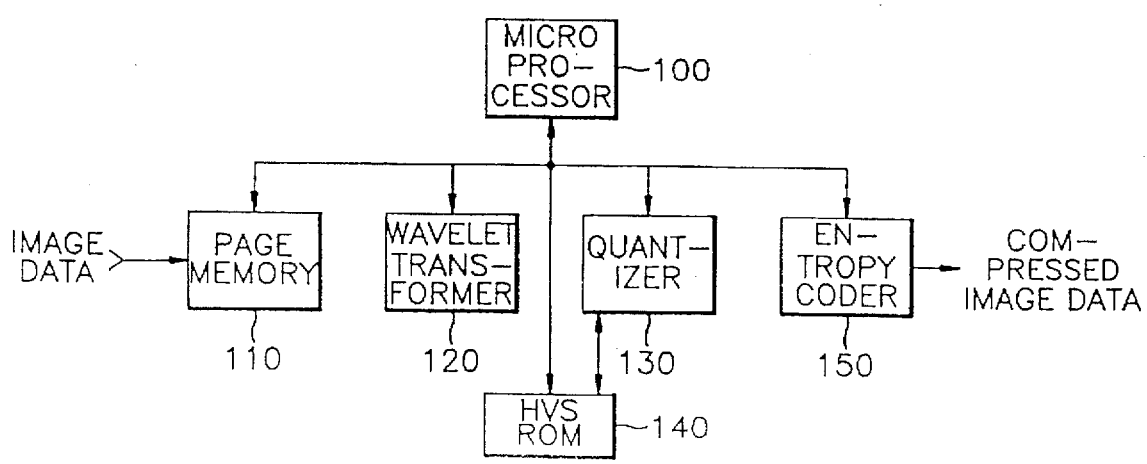
FIG. 4 is a block diagram of a wavelet image compression circuit constructed according to the principles of the present invention.

Referring now to FIG. 4, a block diagram of a wavelet image compression apparatus constructed according to the principles of the present invention is shown. In FIG. 4, a microprocessor 1100 controls the overall operation of the wavelet image compression apparatus. A page memory 110 stores input image data under the control of microprocessor 100. A wavelet transformer 120 transforms the image data received from page memory 110 into wavelet data. Wavelet transformer 120 may use two kinds of finite-impulse-response (FIR) filters, as shown in FIG. 2. That is, a 4-tap or 6-tap FIR filter proposed by Daubechies may be used. Alternatively, an even-numbered-tap FIR filter which is capable of performing Haar-transformations may be utilized for wavelet transforms. A human visual system (HVS), read only memory ROM 140 stores a first quantization value FS corresponding to each frequency variation. A quantizer 130 receives the wavelet transformed data and the first quantization value FS corresponding to the frequency variation of each frequency region, and calculates second and third quantization values BS and ES respectively corresponding to the background brightness and the edge state of the lowest frequency region in the domain of the data. Furthermore, quantizer 130 determines a human visual quantization value qstep for each frequency region corresponding to the first, second and third quantization values FS, BS and ES, and quantizes the wavelet transformed data by use of the human visual quantization value qstep. The human visual quantization value qstep for quantizing the wavelet data is determined on a basis of the frequency, background brightness and edge state. An entropy encoder 150 entropy encodes the quantized data to generate final compressed data. Entropy encoder 150 may use a Huffman code or an arithmetic code, among other codes.

Figure 5:
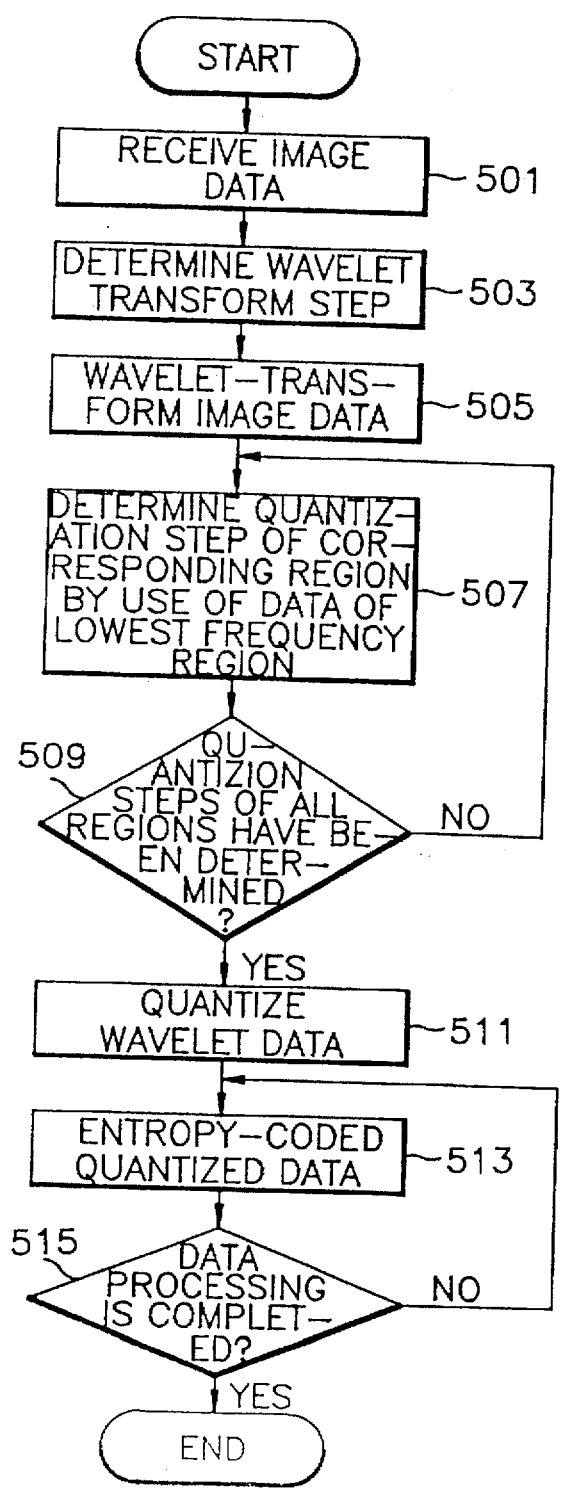
FIG. 5 is a flow chart showing operations of the wavelet image compression method performed according to the principles of the present invention.

Referring now to FIG. 5, a flow chart showing operations of the wavelet image compression method performed according to the principles of the present invention is illustrated. The wavelet transform image compression method of FIG. 5 utilizes a model based on the human visual system.

At step 501, wavelet transformer 120 receives the image data from page memory 110. At step 503, wavelet transformer 120 determines that a wavelet transform step for wavelet transforming the image data is to be performed. The wavelet transform step is performed in accordance with the filter structure of wavelet transformer 120. At step 505, wavelet transformer 120 wavelet-transforms the image data to generate wavelet data. At step 507, the human visual quantization value qstep of a corresponding region is determined by using data of the lowest frequency region. The human visual quantization value qstep can be obtained after the first, second and third quantization values FS, BS and ES based on frequency, background brightness and edge state, respectively, are determined as follows.

First quantization value FS according to frequency variation

Since the noise sensitivity according to frequency variation is lower at a high frequency, the first quantization value FS is determined such that it is small at a low frequency and large at a high frequency. The first quantization value FS is stored in HVS ROM 140.

Second quantization value BS according to background brightness variation

The noise sensitivity according to background brightness variation is lower for a very bright or dark background, and increases for a background of intermediate brightness. The second quantization value BS determined by modeling a quadratic function is given by:

$$BS(s,x,y) = \qquad (1)$$

$$a+b^2 \times \left( \sum_{i=0}^{1} \sum_{j=0}^{1} I^{n,LL}\left( i+\frac{x}{2^{n-s}}, j+\frac{y}{2^{n-s}} \right) - 4 \times c \right)^2$$

where a is a minimum quantization value, b is a parameter for determining the range of the quantization value, c is a parameter for determining the position of intermediate brightness, s is a wavelet step factor, and n is the highest wavelet step value.

Third quantization value ES according to edge state

Since the human eye is not very sensitive to the edge portion of an image, noise sensitivity for the edge portion is determined by increasing the third quantization value ES at a unit region for a strong edge component and reducing the third quantization value ES for a weak edge component. In the preferred embodiment of the present invention, quantization is modeled by a piecewise linear function to determine the third quantization value ES according to the edge state indicated by the following expression (2). To identify the edge, a difference between the wavelet data from horizontal, vertical and diagonal directions is used as a parameter.

$$ES(s,x,y) = d, \text{ if } |I_h| + |I_v| + |I_d| < m, \qquad (2)$$

$$ES(s,x,y) = \left( \frac{e-d}{f-m} \right)(|I_h|+|I_v|+|I_d|)+d-\left( \frac{e-d}{f-m} \right),$$

$$\text{if } |I_h|+|I_v|+|I_d| \geq m$$

$$I_h = I^{n,LL}\left( \frac{x}{2^{n-s}}, \frac{y}{2^{n-s}} \right) - I^{n,LL}\left( 1+\frac{x}{2^{n-s}}, \frac{y}{2^{n-s}} \right) \qquad (3)$$

$$I_v = I^{n,LL}\left( \frac{x}{2^{n-s}}, \frac{y}{2^{n-s}} \right) - I^{n,LL}\left( \frac{x}{2^{n-s}}, 1+\frac{y}{2^{n-s}} \right) \qquad (4)$$

$$I_d = I^{n,LL}\left( \frac{x}{2^{n-s}}, \frac{y}{2^{n-s}} \right) - I^{n,LL}\left( 1+\frac{x}{2^{n-s}}, 1+\frac{y}{2^{n-s}} \right) \qquad (5)$$

where d is a minimum quantization value (d=a), e is a maximum quantization value, f is a maximum value of $|I_h|+|I_v|+|I_d|$, and m is a value of $|I_h|+|I_v|+|I_d|$ is regarded as a limitation between an edge portion and a background portion, which may be used with any value in a range from 1% to 10% of the maximum value of $|I_h|+|I_v|+|I_d|$.

Accordingly, the first, second and third quantization values FS, BS and ES based on so frequency, background brightness and edge state are calculated, and then the human visual quantization value qstep of a corresponding region can be obtained by the following expression:

$$qstep(r,s,x,y)=k \times FS(r,s) \times min(BS(s,x,y),ES(s,x,y)) \qquad (6)$$

where k is an arbitrary constant, and min(BS(s,x,y), is the minimum value of the second quantization value and ES(s, x,y)) is the minimum value of the third quantization value.

Referring again to FIG. 5, whether the human visual quantization values qstep for all of the regions have been determined is checked at step 509. If all of the quantization values have not been determined, step 509 returns to step 507 to determine the human visual quantization value for the next region. If all of the quantization values have been determined, step 511 is then performed.

At step 511, the wavelet data of a corresponding region is quantized with the human visual quantization value of each region set in steps 507 and 509. At step 513, entropy encoder 150 entropy-encodes the quantized data to compress the image. Since data at the lowest frequency region has the largest amount of information, the image is transmitted without losing information. At step 515, a determination is then made as to whether the processing of data has been complete.

To determine the quantization values BS and ES according to background brightness and edge state, a portion having the lowest frequency component (i.e. the wavelet data for (n,LL)) is used. To quantize a factor of a point (x,y), that point, and horizontal, vertical and diagonal directional points are used. During the wavelet transform, since each region shows a very similar characteristic, points at higher frequency regions are indicated by the same expression. Namely, blocks positioned at a similar region of each wavelet step implement the same values as for (n,LL). Therefore, when transmitting the compressed image, there is no need to send additional data. Since a quantization value obtained for (n,LL) is applied to the quantization of the factor of the frequency region, the compression time is fast.

A wavelet transform image recovery apparatus and method using the modeling of the human visual system according to the principles of the present invention will now be described in detail with reference to FIGS. 6 and 7.

Figure 6:
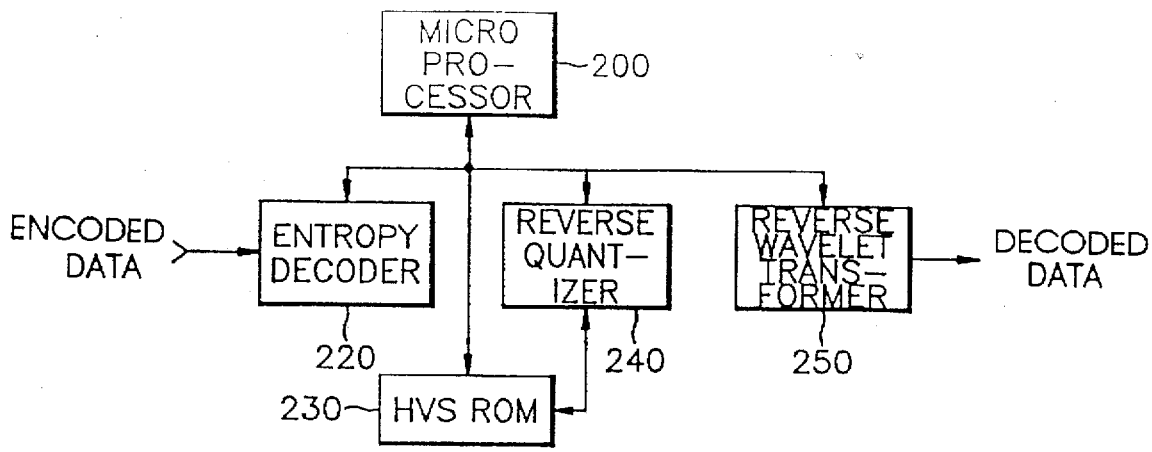
FIG. 6 is a block diagram of a wavelet image recovery circuit constructed according to the principles of the present invention.

Referring to FIG. 6, the wavelet transform image recovery apparatus includes a microprocessor 200 for controlling the overall operation. An entropy decoder 220 decodes entropy encoded data received from the exterior, and generates decoded data and a corresponding human visual quantization value qstep. Entropy decoder 220 may use the Huffman code, arithmetic code or another code employed in the image compression apparatus shown in FIG. 4. A human visual system (HVS) read only memory ROM 230 has a factor value corresponding to the human visual quantization value qstep. A reverse quantizer 240 receives the decoded data and the human visual quantization value qstep from entropy decoder 220 and reads the factor value corresponding to the human visual quantization value qstep from HVS ROM 230 to convert the quantized data to wavelet data with a bit resolution form. A reverse wavelet transformer 250 performs a reverse wavelet transform on the wavelet data received from reverse quantizer 240 in order to recover the image data.

Figure 7:
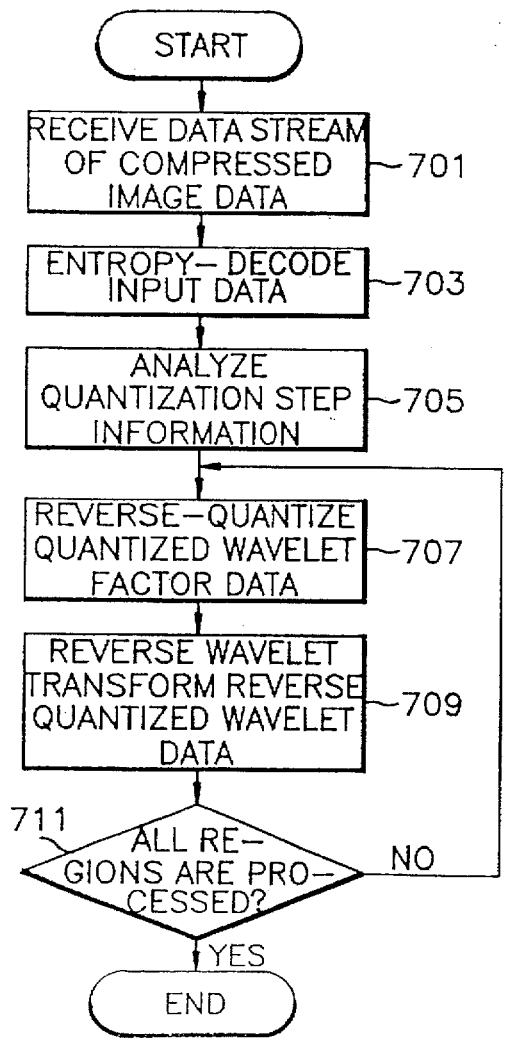
FIG. 7 is a flow chart showing operations of the wavelet image recovery method performed according to the principles of the present invention.

Referring now to FIG. 7, a flow chart showing operations of the wavelet image recovery method performed according to the principles of the present invention is illustrated. At step 701, entropy decoder 220 receives a data stream of compressed image data. At step 703, entropy decoder 220 entropy-decodes the input data. At step 705, reverse quantizer 240 takes the human visual quantization value qstep for each unit region from the entropy decoded data and reads out the factor value corresponding to the human visual quantization value qstep from HVS ROM 230. At step 707, reverse quantizer 240 reverse-quantizes the quantized wavelet data of a corresponding region in dependence upon the factor value and the human visual quantization value qstep. At step 709, reverse wavelet transformer 250 performs a reverse wavelet transform on the reverse quantized wavelet data to generate decoded data.

As described above, the present invention uses the modeling of a human visual system to quantize and reverse-quantize wavelet transform data.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiment disclosed as the best mode contemplated for carrying out the present invention, but that the present invention includes all embodiments falling within the scope of the appended claims.

What is claimed is:

1. A wavelet transform image compression method of an image processor using modeling of a human visual system, comprising the steps of:

receiving image data and wavelet-transforming said image data to generate wavelet transformed data;

receiving from a storage medium a first quantization value corresponding to a frequency variation of said wavelet transformed data in each frequency region;

determining a second quantization value corresponding to background brightness represented by said wavelet transformed data within a lowest frequency region;

determining a third quantization value corresponding to an edge state represented by said wavelet transformed data within said lowest frequency region;

determining a human visual quantization value for each said frequency region in dependence upon a product of said first quantization value, a minimum of said second quantization value and said third quantization value;

quantizing said wavelet transformed data within each said frequency region by use of said human visual quantization value of each said frequency region to generate quantized data; and generating compressed image data from said quantized data.

2. The wavelet transform image compression method as set forth in claim 1, further comprising a step of receiving said compressed image data at a receiving port.

3. The wavelet transform image compression method as set forth in claim 2, wherein said human visual quantization value is determined by the following expression:

human visual quantization value=k first quantization value min(second quantization value, third quantization value), where k is a constant.

4. The wavelet transform image compression method as set forth in claim 3, wherein said second quantization value is determined by the following expression:

second quantization value $(s,x,y) =$ $$a + b^2 \times \left( \sum_{i=0}^{1} \sum_{j=0}^{1} I^{n,LL}\left( i + \frac{x}{2^{n-s}}, j + \frac{y}{2^{n-s}} \right) - 4 \times c \right)^2$$

where a is a minimum value for said second quantization value, b is a parameter for determining a range for said second quantization value, c is a parameter for determining a position of intermediate brightness, s is a wavelet step factor, and n is a highest wavelet step value.

5. The wavelet transform image compression method as set forth in claim 4, wherein said third quantization value is determined by the following expression:

third quantization value $(s,x,y)$ = $d$, if $|U_h| + |U_v| + |U_d| < m$, and $= \left( \frac{e-d}{f-m} \right)(|U_h| + |U_v| + |U_d|) + d - \left( \frac{e-d}{f-m} \right),$ if $|U_h| + |U_v| + |U_d| \geq m$ where d is a minimum value for said third quantization value, e is a maximum value for said third quantization value, f is a maximum value for $|I_n|+|I_v|+|I_d|$, and m is a value of $|I_n|+|I_v|+|I_d|$ indicating a division between an edge portion and a background portion of an image represented by said image data.

6. The wavelet transform image compression method as set forth in claim 1, wherein said human visual quantization value is determined by the following expression:

human visual quantization value=k first quantization value min (second quantization value, third quantization value), where k is a constant.

7. The wavelet transform image compression method as set forth in claim 1, wherein said second quantization value is determined by the following expression:

second quantization value $(s,x,y) =$ $$a + b^2 \times \left( \sum_{i=0}^{1} \sum_{j=0}^{1} I^{n,LL}\left( i + \frac{x}{2^{n-s}}, j + \frac{y}{2^{n-s}} \right) - 4 \times c \right)^2$$

where a is a minimum value for said second quantization value, b is a parameter for determining a range for said second quantization value, c is a parameter for determining a position of intermediate brightness, s is a wavelet step factor, and n is a highest wavelet step value.

8. The wavelet transform image compression method of claim 7, wherein said compressed image data is generated by entropy-encoding said quantized data.

9. The wavelet transform image compression method of claim 1, wherein said compressed image data is generated by entropy-encoding said quantized data.

10. The wavelet transform image compression method as set forth in claim 2, wherein said second quantization value is determined by the following expression:

second quantization value $(s,x,y) =$ $$a + b^2 \times \left( \sum_{i=0}^{1} \sum_{j=0}^{1} I^{n,LL}\left( i + \frac{x}{2^{n-s}}, j + \frac{y}{2^{n-s}} \right) - 4 \times c \right)^2$$

where a is a minimum value for said second quantization value, b is a parameter for determining a range for said second quantization value, c is a parameter for determining a position of intermediate brightness, s is a wavelet step factor, and n is a highest wavelet step value.

11. The wavelet transform image compression method as set forth in claim 6, wherein said third quantization value is determined by the following expression:

$$\text{third quantization value } (s,x,y) = d, \text{ if } |U_h| + |U_v| + |U_d|, < m, \text{ and}$$

$$= \left(\frac{e-d}{f-m}\right)(|U_h| + |U_v| + |U_d|) + d - \left(\frac{e-d}{f-m}\right),$$

$$\text{if } |U_h| + |U_v| + |U_d| \geq m$$

where d is a minimum value for said third quantization value, e is a maximum value for said third quantization value, f is a maximum value for $|I_n|+|I_v|+|I_d|$, and m is a value of $|I_n|+|I_v|+|I_d|$ indicating a division between an edge portion and a background portion of an image represented by said image data.

12. The wavelet transform image compression method of claim 2, wherein said compressed image data is generated by entropy-encoding said quantized data.

13. A wavelet image recovery method of a wavelet image recovery apparatus, said method comprising the steps of:

storing a first quantization value corresponding a predetermined human visual quantization value within a memory of said recovery apparatus;

decoding entropy coding data received from an exterior system to generate quantization data based on a human visual system;

determining said predetermined human visual quantization value in dependence upon a product of a first quantization value representative of frequency variation, a minimum second quantization value representative of background brightness and a minimum third quantization value representative of an edge state of said wavelet data;

reading said quantization data and reverse-quantizing said quantization data in dependence upon said predetermined human visual quantization value and said reverse quantization factor value to generate wavelet data; and reverse-transforming said wavelet data to generate recovered image data.

14. The wavelet image recovery method as claimed in claim 13, further comprised of said predetermined human visual quantization value being representative of frequency variation, background brightness and an edge state in an image represented by said quantization data.

15. The method of claim 13, wherein said first quantization value correspond to a frequency variation of said wavelet data in each frequency region, said second quantization value correspond to background brightness represented by said wavelet data within a lowest frequency region, and said third quantization value correspond to an edge state represented by said wavelet data within said lowest frequency region.

16. A wavelet transform image compression apparatus using modeling of a human visual system, comprising:

control means for controlling operation of said wavelet transform image compression apparatus;

first storage means for storing image data received from an exterior system; wavelet transform means for transforming, under control of said control means, said image data received from said first storage means into wavelet transformed data;

second storage means for storing a first quantization value corresponding to a frequency variation of said wavelet transformed data in each frequency region; and quantization means for receiving said wavelet transformed data and said first quantization value, calculating second and third quantization values respectively corresponding to background brightness and an edge state represented by said wavelet transformed data in a lowest said frequency region, determining a human visual quantization value for each of said frequency regions in dependence upon a product of said first quantization value a minimum of said second quantization value and said third quantization value, and quantizing said wavelet transformed data to generate quantization data.

17. The wavelet transform image compression apparatus as set forth in claim 16, further comprising entropy-coding means for entropy-coding said quantization data.

18. The wavelet transform image compression apparatus as set forth in claim 17, wherein said second quantization value is determined by the following expression:

second quantization value $(s,x,y) =$ $$a + b^2 \times \left(\sum_{i=0}^{1}\sum_{j=0}^{1} p^{n,LL}\left(i + \frac{x}{2^{n-s}}, j + \frac{y}{2^{n-s}}\right) - 4 \times c\right)^2$$

where a is a minimum value for said second quantization value, b is a parameter for determining a range for said second quantization value, c is a parameter for determining a position of intermediate brightness, s is a wavelet step factor, and n is a highest wavelet step value.

19. The wavelet transform image compression apparatus as set forth in claim 18, wherein said third quantization value is determined by the following expression:

$$\text{third quantization value } (s,x,y) = d, \text{ if } |U_h| + |U_v| + |U_d|, < m, \text{ and}$$

$$= \left(\frac{e-d}{f-m}\right)(|U_h| + |U_v| + |U_d|) + d - \left(\frac{e-d}{f-m}\right),$$

$$\text{if } |U_h| + |U_v| + |U_d| \geq m$$

where d is a minimum value for said third quantization value, e is a maximum value for said third quantization value, f is a maximum value for $|I_n|+|I_v|+|I_d|$, and m is a value of $|I_n|+|I_v|+|I_d|$, indicating a division between an edge portion and a background portion of an image represented by said image data.

20. A wavelet transform image recovery apparatus modeling a human visual system, comprising:

control means for controlling operation of said wavelet transform image recovery apparatus, storage means for storing a reverse quantization factor value corresponding to a human visual quantization value having been determined in dependence upon a product of a first quantization value representative of frequency variation, a minimum second quantization value representative of background brightness and a minimum third quantization value representative of an edge state of wavelet data;

entropy decoding means for decoding entropy coding data received from an exterior system to generate quantization data based on said human visual system;

reverse quantization means for receiving said quantization data and said human visual quantization value from said entropy decoding means, receiving said reverse quantization factor value from said storage means, and for generating said wavelet data by reverse-quantizing said quantization data in dependence upon said human visual quantization value and said reverse quantization factor value; and reverse wavelet transform means for generating recovered image data by reverse transforming said wavelet data.

21. The wavelet transform image recovery apparatus of claim 20, further comprised of said human visual quantization data being representative of frequency variation, background brightness and an edge state in an image represented by said quantization data.

22. The apparatus of claim 20, wherein said first quantization value correspond to a frequency variation of said wavelet data in each frequency region, said second quantization value correspond to background brightness represented by said wavelet data within a lowest frequency region, and said third quantization value correspond to an edge state represented by said wavelet data within said lowest frequency region.

23. A wavelet transform image compression method of an image processor using modeling of a human visual system, comprising the steps of:

receiving image data and wavelet-transforming said image data to generate wavelet transformed data;

receiving from a storage medium a first quantization value corresponding to a frequency variation of said wavelet transformed data in each frequency region;

determining a second quantization value corresponding to background brightness represented by said wavelet transformed data within a lowest frequency region;

determining a third quantization value corresponding to an edge state represented by said wavelet transformed data within said lowest frequency region;

determining a human visual quantization value for each said frequency region in dependence upon said first, second and third quantization values, said human visual quantization value being determined by the following expression;

human visual quantization value=k first quantization value min (second quantization value, third quantization value), where k is a constant;

quantizing said wavelet transformed data within each said frequency region by use of said human visual quantization value of each said frequency region to generate quantized data; and generating compressed image data by entropy-encoding said quantized data to generate compressed image data.

24. A wavelet transform image compression method of an image processor using modeling of a human visual system, comprising the steps of:

receiving image data and wavelet-transforming said image data to generate wavelet transformed data;

receiving from a storage medium a first quantization value corresponding to a frequency variation of said wavelet transformed data in each frequency region;

determining a second quantization value corresponding to background brightness represented by said wavelet transformed data within a lowest frequency region;

determining a third quantization value corresponding to an edge state represented by said wavelet transformed data within said lowest frequency region;

determining a human visual quantization value for each said frequency region in dependence upon said first, second and third quantization values, said human visual quantization value being determined by the following expression:

human visual quantization value=k first quantization value min (second quantization value, third quantization value), where k is a constant;

quantizing said wavelet transformed data within each said frequency region by use of said human visual quantization value of each said frequency region to generate quantized data;

generating compressed image data by entropy-encoding said quantized data to generate compressed image data; and receiving said compressed image data at a receiving port.

25. The wavelet transform image compression method as set forth in claim 24, wherein said second quantization value is determined by the following expression:

second quantization value $(s,x,y) =$ $$a + b^2 \times \left( \frac{1}{\sum_{i=0}} \frac{1}{\sum_{j=0}} I^{n,LL} \left( i + \frac{x}{2^{n-s}}, j + \frac{y}{2^{n-s}} \right) - 4 \times c \right)^2$$

where a is a minimum value for said second quantization value, b is a parameter for determining a range for said second quantization value, c is a parameter for determining a position of intermediate brightness, s is a wavelet step factor, and n is a highest wavelet step value.

26. The wavelet transform image compression method as set forth in claim 25, wherein said third quantization value is determined by the following expression:

$$\text{third quantization value } (s,x,y) = d, \text{ if } |U_h| + |U_v| + |U_d| < m, \text{ and}$$

$$= \left( \frac{e-d}{f-m} \right) (|U_h| + |U_v| + |U_d|) + d - \left( \frac{e-d}{f-m} \right),$$

$$\text{if } |U_h| + |U_v| + |U_d| \geq m$$

where d is a minimum value for said third quantization value, e is a maximum value for said third quantization value, f is a maximum value for $|I_n|+|I_v|+|I_d|$, and m is a value of $|I_n|+|I_v|+|I_d|$ indicating a division between an edge portion and a background portion of an image represented by said image data.

27. A wavelet transform image compression method of an image processor using modeling of a human visual system, comprising the steps of:

receiving image data and wavelet-transforming said image data to generate wavelet transformed data;

receiving from a storage medium a first quantization value corresponding to a frequency variation of said wavelet transformed data in each frequency region;

determining a second quantization value corresponding to background brightness represented by said wavelet transformed data within a lowest frequency region, said second quantization value being determined by the following expression:

second quantization value $(s,x,y) =$ $$a+b^2 \times \left( \sum_{i=0}^{1} \sum_{j=0}^{1} I^{n,LL}\left( i+\frac{x}{2^{n-s}}, j+\frac{y}{2^{n-s}} \right) - 4 \times c \right)^2$$

where a is a minimum value for said second quantization value, b is a parameter for determining a range for said second quantization value, c is a parameter for determining a position of intermediate brightness, s is a wavelet step factor, and n is a highest wavelet step value;

determining a third quantization value corresponding to an edge state represented by said wavelet transformed data within said lowest frequency region;

determining a human visual quantization value for each said frequency region in dependence upon said first, second and third quantization values;

quantizing said wavelet transformed data within each said frequency region by use of said human visual quantization value of each said frequency region to generate quantized data; and generating compressed image data by entropy-encoding said quantized data to generate compressed image data.

28. The wavelet transform image compression method of claim 27, comprised of determining said human visual quantization in dependence upon a product of said first quantization value, said minimum value for said second quantization value and a minimum value for said third quantization value.

29. A wavelet transform image compression method of an image processor using modeling of a human visual system, comprising the steps of:

receiving image data and wavelet-transforming said image data to generate wavelet transformed data;

receiving from a storage medium a first quantization value corresponding to a frequency variation of said wavelet transformed data in each frequency region;

determining a second quantization value corresponding to background brightness represented by said wavelet transformed data within a lowest frequency region, said second quantization value being determined by the following expression:

second quantization value $(s,x,y) =$ $$a+b^2 \times \left( \sum_{i=0}^{1} \sum_{j=0}^{1} I^{n,LL}\left( i+\frac{x}{2^{n-s}}, j+\frac{y}{2^{n-s}} \right) - 4 \times c \right)^2$$

where a is a minimum value for said second quantization value, b is a parameter for determining a range for said second quantization value, c is a parameter for determining a position of intermediate brightness, s is a wavelet step factor, and n is a highest wavelet step value;

determining a third quantization value corresponding to an edge state represented by said wavelet transformed data within said lowest frequency region;

determining a human visual quantization value for each said frequency region in dependence upon said first, second and third quantization values;

quantizing said wavelet transformed data within each said frequency region by use of said human visual quantization value of each said frequency region to generate quantized data;

generating compressed image data by entropy-encoding said quantized data to generate compressed image data; and receiving said compressed image data at a receiving port.

30. The wavelet transform image compression method as set forth in claim 29, wherein said third quantization value is determined by the following expression:

third quantization value $(s,x,y) = d$, if $|I_h|+|I_v|+|I_d| < m$, and $$= \left( \frac{e-d}{f-m} \right)(|I_h|+|I_v|+|I_d|) + d - \left( \frac{e-d}{f-m} \right),$$

if $|I_h|+|I_v|+|I_d| \geq m$ where d is a minimum value for said third quantization value, e is a maximum value for said third quantization value, f is a maximum value for $|I_h|+|I_v|+|I_d|$, and m is a value of $|I_h|+|I_v|+|I_d|$ indicating a division between an edge portion and a background portion of an image represented by said image data.

31. A wavelet transform image compression apparatus using modeling of a human visual system, comprising:

control means for controlling operation of said wavelet transform image compression apparatus;

first storage means for storing image data received from an exterior system;

wavelet transform means for transforming said image data received from said first storage means into wavelet transformed data under the control of said control means;

second storage means for storing a first quantization value corresponding to a frequency variation of said wavelet transformed data in each frequency region;

quantization means for receiving said wavelet transformed data and said first quantization value, calculating second and third quantization values respectively corresponding to background brightness and an edge state represented by said wavelet transformed data in a lowest said frequency region, determining a human visual quantization value for each said frequency region in dependence upon said first, second and third quantization values, said human visual quantization value being determined in dependence upon a product of said first quantization value, a minimum said second quantization value, and a minimum said third quantization value an arbitrary, and quantizing said wavelet transformed data to generate quantization data; and entropy-coding means for entropy-coding said quantization data.

32. The wavelet transform image compression apparatus as set forth in claim 31, wherein said second quantization value is determined by the following expression:

second quantization value $(s,x,y) =$ $$a + b^2 \times \left( \sum_{i=0}^{1} \sum_{j=0}^{1} I^{nLL}\left( i + \frac{x}{2^{n-s}}, j + \frac{y}{2^{n-s}} \right) - 4 \times c \right)^2$$

where a is a minimum value for said second quantization value, b is a parameter for determining a range for said second quantization value, c is a parameter for determining a position of intermediate brightness, s is a wavelet step factor, and n is a highest wavelet step value.

33. The wavelet transform image compression apparatus as set forth in claim 32, wherein said third quantization value is determined by the following expression:

third quantization value $(s,x,y)$ = $d$, if $|I_h| + |I_v| + |I_d| < m$, and

= $\left( \frac{e-d}{f-m} \right)(|I_h| + |I_v| + |I_d|) + d - \left( \frac{e-d}{f-m} \right)$, if $|I_h| + |I_v| + |I_d| \geq m$ where d is a minimum value for said third quantization value, e is a maximum value for said third quantization value, f is a maximum value for $|I_h|+|I_v|+|I_d|$, and m is a value of $|I_h|+|I_v|+|I_d|$ indicating a division between an edge portion and a background portion of an image represented by said image data.

34. A wavelet transform image compression method of an image processor using modeling of a human visual system, comprising the steps of:

receiving image data and wavelet-transforming said image data to generate wavelet transformed data;

receiving from a storage medium a first quantization value corresponding to a frequency variation of said wavelet transformed data in each frequency region;

determining a second quantization value corresponding to background brightness represented by said wavelet transformed data within a lowest frequency region;

determining a third quantization value corresponding to an edge state represented by said wavelet transformed data within said lowest frequency region;

determining a human visual quantization value for each said frequency region in dependence upon a product of said first quantization value, a minimum said second quantization value and a minimum said third quantization value;

quantizing said wavelet transformed data within each said frequency region by use of said human visual quantization value of each said frequency region to generate quantized data; and generating compressed image data by entropy-encoding said quantized data to generate compressed image data.

35. The wavelet transform image compression method as set forth in claim 34, further comprising a step of receiving said compressed image data at a receiving port.

* * * * *